United States Patent
Grossman et al.

(10) Patent No.: US 6,309,753 B1
(45) Date of Patent: Oct. 30, 2001

(54) COATED ULTRAVIOLET ABSORBING GLASS

(75) Inventors: David G. Grossman, Corning; Ronald L. Stewart, Elmira, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/370,731

(22) Filed: Aug. 9, 1999

Related U.S. Application Data

(60) Provisional application No. 60/098,541, filed on Aug. 31, 1998.

(51) Int. Cl.[7] ............................... B32B 17/06; B32B 9/00
(52) U.S. Cl. ........................ 428/428; 428/432; 428/697; 428/213; 428/334
(58) Field of Search .................................... 428/426, 428, 428/432, 213, 216, 334, 697

(56) References Cited

U.S. PATENT DOCUMENTS

| | | | |
|---|---|---|---|
| 5,897,957 | 4/1999 | Goodman | 428/432 |
| 5,925,468 | 7/1999 | Stewart | 428/426 |

*Primary Examiner*—Deborah Jones
*Assistant Examiner*—Stephen Stein
(74) *Attorney, Agent, or Firm*—Anca C. Gheorghiu; Vincent T. Kung

(57) ABSTRACT

This article is a glass substrate having a coating thereon. The coating strongly absorbs certain ultraviolet radiation. The preferred coating absorbs ultraviolet radiation at wavelengths ranging from 230 up to at least 280 nm while providing high transmission throughout a region of visible wavelengths. The preferred coating consisting essentially of three layers, wherein the first layer adjacent the substrate is a mixture of $SiO_2$ and $TiO_2$; the second layer is $TiO_2$ and the third layer farthest from the substrate is $SiO_2$.

17 Claims, No Drawings

COATED ULTRAVIOLET ABSORBING GLASS

This application claims the benefit of U.S. Provisional Application 60/098,541 filed Aug. 31, 1998.

TECHNICAL FIELD

This invention relates to a glass substrate having a coating thereon. The coating strongly absorbs ultraviolet radiation. In one embodiment, the glasses also absorb ultraviolet radiation.

BACKGROUND OF THE INVENTION

When optical systems use high power lamp light sources, there can be a significant radiative proportion of the light emitting in the ultraviolet region. When organic materials are in the light path, there will be a degradation of this material over time. Ultraviolet radiation also causes degradation and discoloration in such items as paints, fabrics and plastics. Specifically, electromagnetic energy in the ultraviolet spectrum (i.e., between ~100 and ~400 nanometers), causes paints and dyes to fade, causes rubber to crack, and plastics to crumble with time. Therefore, strong ultraviolet absorption by architectural glazing materials is beneficial.

The sun is not the only light source that emits ultraviolet radiation. Various artificial lighting sources like Hg or Xe ARC and other discharge lamps emit ultraviolet radiation. Ultraviolet absorbing glasses can be used that block the entire range of the ultraviolet emission of these sources. However, as a result of the absorption, with prolonged usage, many glasses tend to solarize or darken with time, especially from the absorption of the shorter wavelength, higher energy portion of the ultraviolet region.

Ultraviolet absorbing glass trademarked Pyrex-UV-Plus™ (available from Corning Incorporated), has applications such as fiber optic distributed lighting, Liquid Crystal Projection and other projection technologies. These lighting or projection systems use high intensity discharge light sources which contain radiated output in the ultraviolet spectrum. The Pyrex-UV-Plus™ glass has a very sharp band edge near 400 nm (ultraviolet—visible boundary) which is useful in protecting organic components that degrade under ultraviolet fluence, while providing maximum visible radiation transparency throughout the visible part of the spectrum (400–760 mm). However, some customer and internal testing has shown that certain metal halide lamps which have output in the range of 250–280 nm can cause the absorbing Pyrex-UV-Plus™ glass to photodarken in the visible spectrum. Using glass pre-filters that have cutoffs ≧280 nm can prevent the photodarkening of the Pyrex-UV-Plus™ glass. However, adding two more glass surfaces would reduce the visible transmission. Most of the Pyrex-UV-Plus™ glass applications in fact use anti-reflection coatings applied to the glass surfaces to improve the visible lumen output.

Co-assigned U.S. Pat. No. 5,925,468, by Stewart, titled Solarization Resistant and UV Blocking Glass, filed Apr. 1, 1997, and herein incorporated by reference discloses ultraviolet-absorbing glass combined with a solarization resistant glass article to provide a substantially complete UV spectral blocking filter.

While these glasses provide a substantial improvement in ultraviolet absorbing glasses, there continues to be a need for improved systems. Accordingly, it is the object of the present invention to provide an improved UV-blocking glass.

SUMMARY OF THE INVENTION

We have found that the object of the invention can be attained by use of certain antireflective, hot mirror or heat rejection coatings which absorb radiation when applied to a glass surface. Briefly, the invention relates to a glass substrate having a multilayer coating thereon. The coating absorbs ultraviolet radiation at wavelengths ranging from ~230 to ~300 nm while providing high transmission throughout a region of visible wavelengths. Preferably, the coating consists essentially of three layers, wherein the first layer adjacent the substrate is a mixture of $SiO_2$ and $TiO_2$, the second layer is $TiO_2$ and the third layer farthest from the substrate is $SiO_2$. The coatings are preferably applied by a sol-gel dip method. Titania is an ultraviolet radiation absorber which absorbs photodarkening wavelengths to offer protection for the Pyrex-UV-Plus™ glass and other UV-absorbing glasses.

We ran solarization tests on coated and uncoated glasses using a 1000 watt Hg-Xe lamp, and compared transmission at 500 nm before and after several hours of exposure. A sample with a three-layer sol-gel dip coating consisting of $TiO_2$ and $SiO_2$ was tested along with another that had a deposited $MgF_2$ anti-reflection coating thereon, both versus a non-coated Pyrex-UV-Plus™ glass.

The data indicates that the $TiO_2$ containing coating absorbed the ultraviolet radiation to lessen the photodarkening by a factor of 10 (using the loss of transmission at 500 nm). Other embodiments of the coating which should improve the photodarkening resistance of the glass may be made by inclusion of other ultraviolet absorbers such as ZnO, $CeO_2$, $VO_2$, $Ta_2O_5$ or $Nb_2O_5$.

BEST MODE OF CARRYING OUT INVENTION

A preferred embodiment of this invention is a glass substrate having a multilayer coating thereon wherein the coating absorbs ultraviolet radiation at wavelengths ranging from ~230 to ~300 nm while providing high transmission throughout a region of visible wavelengths. The coating consists essentially of three layers, wherein the first layer adjacent the substrate is a mixture of $SiO_2$ and $TiO_2$, the second layer is a $TiO_2$ rich mixed layer, and the third layer farthest from the substrate is $SiO_2$. The first layer of the coating consists essentially of 25 to 75 weight percent $SiO_2$ and 25 to 75 weight percent $TiO_2$. In a more preferred embodiment, the first layer of the coating consists essentially of 50 weight percent $SiO_2$ and 50 weight percent $TiO_2$. The first layer may also be essentially pure $SiO_2$ or essentially pure $TiO_2$. Although the preffered method of coating application is by sol-gel dip method, other methods such as PVD or CVD may also be employed.

The layers of the coating have a sufficient thickness to absorb ultraviolet radiation at wavelengths ranging from ~230 to ~300 nm while providing high transmission throughout a region of visible wavelengths. Generally, the coating has a thickness ranging from 1500 to 3500 Angstroms. Generally, the first layer has a thickness ranging from 300 to 1200 Angstroms, the second layer has a thickness ranging from 300 to 1200 Angstroms, and the third layer has a thickness ranging from 300 to 1200 Angstroms.

Generally, the glass substrate is capable of absorbing ultraviolet radiation at wavelengths in the 4–400 nm region, while providing high transmission throughout the visible region. More specifically, this glass transmits wavelengths in the visible and near infra red regions, while absorbing UV wavelengths in the 4 to 400 nm region. A particularly useful example of such ultraviolet blocking glass is the non-photochromic (no photodarkening under solar air mass on exposure) $R_2O$—$B_2O_3$—$SiO_2$ glass of U.S. Pat. No. 5,322,819 (herein incorporated by reference), which contains a precipitated cuprous or cuprous-cadmium halide crystal phase and has a sharp spectral cutoff at about 400 nm. The '819 glass composition consists essentially of, in cation percent, 35–73% $SiO_2$, 15–45% $B_2O_3$, 0–12% $Al_2O_3$, the $Al_2O_3$ being less than 10% when the $SiO_2$ is over 55%, 0–12% $Li_2O$, 0–20%, $Na_2O$, 0–12% $K_2O$, the $Li_2O+Na_2O+K_2O$ being 4.75–20%, 0–5% $CaO+BaO+SrO$, 0.125–1.0% $Cu_2O$, 0–1% CdO, 0–5% $ZrO_2$, 0–0.75% $SnO_2$, 0–1% $As_2O_3$, and/or $Sb_2O_3$, the glass containing 0–1.25% Cl, 0–1.0% Br, 0.25–2.0% Cl+Br, and 0–2% F by weight, and having an R-value, calculated in mole percent, of about 0.15–0.45, the R-value not exceeding 0.30, except as the glass composition meets at least one condition selected from the group: up to 12 cation % $Li_2O$, less than 10 cation % $Al_2O_3$, at least 0.3 cation % $Cu_2O$ and 0.50–2.0 wgt. % Cl+Br where $$R = \frac{M_2O + 2MO - Al_2O_2}{B_2O_3}$$

where the glass oxide values are in cation %.

where the glass oxide values are in cation %.

Another embodiment of this invention is a glass substrate having a coating thereon wherein the coating absorbs ultraviolet radiation at wavelengths in the 230–300 nm region while allowing high transmission throughout the region of visible wavelengths, wherein the coating comprises at least one of the oxides of aluminum, silicon, tantalum, titanium, cerium, niobium, hafnium or the rare earth elements. These coatings are used with a glass substrate that is capable of sharply cutting off ultraviolet radiation at wavelengths in the 400 nm region, while providing high transmission throughout the visible region. With these oxide coatings, the preferred glass also is an '819 glass composition. With the '819 glass composition, a most preferred coating contains $TiO_2$.

EXAMPLES

1. An optical glass having a composition of the '819 glass, capable of absorbing throughout the ultraviolet to wavelengths of 400 nm, while providing high transmission through the visible into the near IR (2500 nm) was coated with a three layer sol-gel coating containing $TiO_2$ and $SiO_2$. The coating layers were configured to provide anti-reflection throughout the visible, wherein the first layer adjacent the substrate was a mixture of $SiO_2$ and $TiO_2$; the second layer was $TiO_2$ and the third layer farthest from the substrate was $SiO_2$. The first layer of the coating was mixture of 50 weight percent $SiO_2$ and 50 weight percent $TiO_2$.

A photodarkening test was run on coated and uncoated glasses using a 1000 watt Hg-Xe lamp, and comprising a transmission reading at 500 nm before and after 51.5 hour lamp exposures six inches from the lamp's reading quartz envelope. This lamp has a high irradiance in the 230 nm and above spectral region. A sample with the three-layer sol-gel dip coating consisting of $TiO_2$ and $SiO_2$ was tested along with another that had a deposited $MgF_2$ anti-reflection coating. The results are shown below compared to an unexposed control sample.

The transmission at 500 nm was as follows:

TABLE 1

|  | Before Exposure | After Exposure | Change |
| --- | --- | --- | --- |
| Sol-gel $TiO_2/SiO_2$ Coating | 98.8 | 96.7 | −2.1 |
| $MgF_2$ Coating | 94.5 | 70.4 | −24.1 |
| No Coating | 92.3 | 56.6 | −35.7 |
| Control | 92.3 | 92.5 | +0.2 |

The data indicates that the $TiO_2$ containing coating absorbed enough ultraviolet radiation to lessen the photo-darkening by a factor of 10 (using the loss of transmission at 500 nm).

2. In another example, UV-blocking glass (Glass Code 8511, available from Corning Incorporated), was coated with three layers of $TiO_2/SiO_2$ anti-reflective material (Coated), and tested against uncoated chemically strengthened (Chem. Strengthened) 8511 glass, and uncoated 8511 glass (Uncoated). The Control sample was an unexposed 8511 glass.

| 8511 Glass Composition | |
| --- | --- |
| $SiO_2$ | 59.7 ± 0.30 |
| $Al_2O_3$ | 11.2 ± 0.20 |
| $B_2O_3$ | 17.4 ± 0.20 |
| $Li_2O$ | 2.00 ± 0.10 |
| $Na_2O$ | 4.48 ± 0.15 |
| $K_2O$ | 3.30 ± 0.15 |
| CuO | 0.39 ± 0.03 |
| $SnO_2$ | 0.63 ± 0.03 |
| Br | 0.31 ± 0.01 |
| Cl | 0.077 ± 0.01 |

The measured transmissions (%), at 500 nm were as follows:

| Exposure Time (Hours) | Coated | Chem. Strengthened | Uncoated | Control |
| --- | --- | --- | --- | --- |
| 0 | 98.8 | 92.4 | 92.3 | 92.3 |
| 51 | 96.7 | 71.2 | 56.6 | 92.5 |
| 103 | 94.8 | 63.1 | 51.3 | 92.1 |
| 216 | 93.6 | 62.0 | 52.6 | 92.2 |

The present invention is particularly useful in applications where ultraviolet blocking glass such as the '819 glass is to be used with artificial light sources, in particular high intensity discharge lamps. In general, the present invention is useful in any applications where short wavelength UV radiation is present in a light source output that reaches the glass. However, this coated glass could also be used in outer space applications.

In addition to the embodiments discussed above, it will be clear to persons skilled in the art that numerous modifications and changes can be made to the above invention without departing from its intended spirit and scope.

We claim:

1. A glass substrate having a multilayer coating, the coating comprises at least three layers,
   (1) a first layer adjacent to a said substrate consisting essentially of a mixture of $SiO_2$ and $TiO_2$,
   (2) a second layer consisting essentially of $TiO_2$, and
   (3) a third layer, farthest from said substrate, consisting essentially of $SiO_2$, wherein the coating absorbs ultraviolet radiation at wavelengths ranging from about 230 nm to about 300 nm, while providing transmission throughout visible wavelengths.

2. A coated glass substrate according to claim 1 wherein the first layer of the coating consists essentially of 25 to 75 weight percent $SiO_2$ and 25 to 75 weight percent $TiO_2$.

3. A coated glass substrate according to claim 1 wherein the first layer of the coating consists essentially of 50 weight percent $SiO_2$ and 50 weight percent $TiO_2$.

4. A coated glass substrate according to claim 1 wherein the coating has a thickness ranging from 1500 to 3500 Angstroms.

5. A coated glass substrate according to claim 1 wherein the first layer has a thickness ranging from 300 to 1200 Angstroms.

6. A coated glass substrate according to claim 1 wherein the second layer has a thickness ranging from 300 to 1200 Angstroms.

7. A coated glass substrate according to claim 1 wherein the third layer has a thickness ranging from 300 to 1200 Angstroms.

8. A coated glass substrate according to claim 1 wherein the glass substrate is capable of absorbing ultraviolet radiation at wavelengths in the 380 to 420 nm region, while providing high transmission throughout the visible region.

9. A coated glass substrate according to claim 8 wherein the glass substrate is an ultraviolet blocking glass, and the coated glass is a photodarkening resistant optical element.

10. A coated glass substrate according to claim 9 wherein the ultraviolet blocking glass contains a precipitated cuprous or cuprous-cadmium halide crystal phase and has a sharp spectral cutoff in the 380 to 420 nm region, the glass composition consisting essentially of, in cation percent, 35–73% $SiO_2$, 15–45% $B_2O_3$, 0–12% $Al_2O_3$, the $Al_2O_3$ being less than 10% when the $SiO_2$ is over 55%, 0–12% $Li_2O$, 0–20% $Na_2O$, 0–12% $K_2O$, the $Li_2O+Na_2O+K_2O$ being 4.75–20%, 0–5% CaO+BaO+SrO, 0.125–1.0% $Cu_2O$, 0–1% CdO, 0–5% $ZrO_2$, 0–0.75% $SnO_2$, 0–1% $As_2O_3$, and/or $Sb_2O_3$, the glass containing 0–1.25% Cl, 0–1.0% Br, 0.25–2.0% Cl+Br, and 0–2% F by weight, and having an R-value, calculated in mole percent, of about 0.15–0.45, the R-value not exceeding 0.30, except as the glass composition meets at least one condition selected from the group: up to 12 cation % $Li_2O$, less than 10 cation % $Al_2O_3$, at least 0.3 cation % $Cu_2O$ and 0.50–2.0 wt.% Cl+Br.

11. A coated glass substrate according to claim 9 wherein the photodarkening resistant glass is a glass capable of transmitting wavelengths in the visible and near infra red regions.

12. A coated glass substrate according to claim 11 wherein the photodarkening resistant glass is capable of blocking wavelengths in the 0 to 340 nm region.

13. A coated glass substrate according to claim 11 wherein the photodarkening resistant glass begins a total absorption of ultraviolet light in the wavelength range of 200 to 340 nm.

14. A coated glass substrate according to claim 11 wherein the photodarkening resistant glass begins total absorption of ultraviolet light in the wavelength range of 260 to 300 nm.

15. A glass substrate having a multilayer coating thereon wherein the coating absorbs ultraviolet radiation at wavelengths ranging from 250 to 280 nm while providing transmission throughout visible wavelengths, the coating consisting essentially of three layers, wherein the first layer adjacent the substrate is a mixture of $SiO_2$, and $TiO_2$, wherein the glass substrate is capable of absorbing ultraviolet radiation at wavelengths in the 400 nm region, while providing transmission throughout the visible wavelengths, said glass substrate comprising an ultraviolet blocking glass, and a photodarkening resistant glass.

16. An optical body comprising:
a) a glass substrate capable of absorbing ultraviolet radiation at wavelengths in the 4–400 nm region, while providing high transmission throughout the visible region into the near infrared region;
b) said glass having thereon a coating comprised of at least three layers,
(1) a first layer adjacent to a said glass consisting essentially of a mixture of $SiO_2$ and $TiO_2$,
(2) a second layer consisting essentially of $TiO_2$, and
(3) a third layer, farthest from said glass, consisting essentially of $SiO_2$;
the coating absorbs ultraviolet radiation at wavelengths in the 230–300 nm region while providing high transmission throughout a region of visible wavelengths;
the coating comprising at least one of the oxides of tantalum, titanium, cerium, niobium, hafnium, or rare earth metals.

17. A coated glass substrate according to claim 16 wherein the glass contains a precipitated cuprous or cuprous-cadmium halide crystal phase and has a sharp spectral cutoff at about 400 nm, the glass composition consisting essentially of, in cation percent, 35–73% $SiO_2$, 15–45% $B_2O_3$, 0–12% $Al_2O_3$, the $Al_2O_3$ being less than 10% when the $SiO_2$ is over 55%, 0–12% $Li_2O$, 0–20%, $Na_2O$, 0–12% $K_2O$, the $Li_2O+Na_2O+K_2O$ being 4.75–20%, 0–5% CaO+BaO+SrO, 0.125–1.0% $Cu_2O$, 0–1% CdO, 0–5% $ZrO_2$, 0–0.75% $SnO_2$, 0–1% $As_2O_3$, and/or $Sb_2O_3$, the glass containing 0–1.25% Cl, 0–1.0% Br, 0.25–2.0% Cl+Br, and 0–2% F by weight, and having an R-value, calculated in mole percent, of about 0.15–0.45, the R-value not exceeding 0.30, except as the glass composition meets at least one condition selected from the group: up to 12 cation % $Li_2O$, less than 10 cation % $Al_2O_3$, at least 0.3 cation % $Cu_2O$ and 0.50–2.0 wgt. % Cl+Br.

* * * * *